US007175351B2

(12) United States Patent
Ono et al.

(10) Patent No.: US 7,175,351 B2
(45) Date of Patent: Feb. 13, 2007

(54) TAPERED ROLLER BEARING

(75) Inventors: Kenichi Ono, Nagoya (JP); Kunihiko Yokota, Nisshin (JP); Hiroshi Tachi, Nagoya (JP)

(73) Assignee: Koyo Seiko Co., Ltd., Osaka (JP)

( * ) Notice: Subject to any disclaimer, the term of this patent is extended or adjusted under 35 U.S.C. 154(b) by 55 days.

(21) Appl. No.: 11/054,605

(22) Filed: Feb. 10, 2005

(65) Prior Publication Data
US 2005/0213861 A1   Sep. 29, 2005

(30) Foreign Application Priority Data
Mar. 25, 2004 (JP) .............................. P2004-088949

(51) Int. Cl.
*F16C 19/50* (2006.01)
*F16C 33/46* (2006.01)
*F16C 33/66* (2006.01)

(52) U.S. Cl. ................. 384/571; 384/470; 384/572

(58) Field of Classification Search ............... 384/571, 384/572, 575, 470, 560, 564, 462, 473; 475/246, 475/247; 74/467
See application file for complete search history.

(56) References Cited

U.S. PATENT DOCUMENTS

| 1,003,055 | A | * | 9/1911 | Lockwood | ................. | 384/571 |
| 1,057,861 | A | * | 4/1913 | Lockwood | ................. | 384/571 |
| 1,282,450 | A | * | 10/1918 | Miller | ......................... | 384/470 |
| 3,744,863 | A | * | 7/1973 | Derner et al. | ............... | 384/571 |
| 5,711,738 | A | * | 1/1998 | Abe et al. | .................... | 475/246 |

FOREIGN PATENT DOCUMENTS

| JP | 10-89353 | 4/1998 |
| JP | 11-48805 | 2/1999 |

* cited by examiner

*Primary Examiner*—Thomas R. Hannon
(74) *Attorney, Agent, or Firm*—McGinn IP Law Group, PLLC

(57) ABSTRACT

A tapered roller bearing comprises an outer race, an inner race, a plurality of tapered rollers, and a cage. A small-diameter end portion of the inner race is formed with a small flange portion for limiting axial movement of the tapered rollers and a cylindrical portion which has a less diameter than the small flange portion and is connected to an axial outer end of the small flange portion. The cage is formed at a small-diameter end portion thereof with a bent portion which is bent inward in a radial direction. A small-diameter end portion of the cage has a bent portion which is faced to an outer surface of the cylindrical portion of the inner race with a predetermined clearance therefrom such that a labyrinth is created between the cage and the inner race.

15 Claims, 7 Drawing Sheets

RELATED ART

TAPERED ROLLER BEARING

BACKGROUND OF THE INVENTION

The present invention relates to a tapered roller bearing, and more particularly, to a tapered roller bearing which is arranged in a final reduction gear of an automotive vehicle, etc. and is lubricated using oil accommodated in the final reduction gear, and a bearing device for supporting a pinion shaft, which supports the pinion shaft using two inclined contact type rolling bearings disposed in a housing.

A tapered roller bearing which is provided with an outer race, an inner race, a plurality of tapered rollers interposed between the outer race and the inner race, and a cage for retaining the tapered rollers has been widely used since it is compact, stands large radial and axial loads and is suitable for high speed rotation. However, when compared to a ball bearing, the tapered roller bearing suffers from a larger torque loss. Therefore, in view of energy utilization efficiency, it is necessary to decrease a torque loss of the tapered roller bearing.

Referring to FIG. 7, a related tapered roller bearing 21 includes an outer race 22, an inner race 23, a plurality of tapered rollers 24 interposed between the outer race 22 and the inner race 23, and a cage 25 for retaining the tapered rollers 24. A small-diameter end portion of the cage 25 is bent radially inward to form a bent portion 25a. The bent portion 25a is positioned opposite to a small flange portion 23a of the inner race 23 with a predetermined clearance defined between the bent portion 25a and the small flange portion 23a.

In Japanese Patent Laid-Open No. 10-89353, there is disclosed a tapered roller bearing which is formed in consideration of the clearance defined between the bent portion of the cage and the small flange portion of the inner race.

In the related tapered roller bearing shown in FIG. 7, by a pumping action resulting from the rotation of the tapered roller bearing, lubricant oil is introduced from a small diameter side of the inner race into the tapered roller bearing and discharged from the tapered roller bearing through a large diameter side of the inner race. Resistance between the tapered rollers and the inner race and resistance by agitation of the lubricant oil serve as factors for generating a rotational torque. In particular, in the case of a tapered roller bearing which is used at a high rotational speed, the resistance by agitation of the lubricant oil occupies a large part of the rotational torque.

In the tapered roller bearing disclosed in Japanese Patent Laid-Open No. 10-89353, a separation phenomenon of the bearing is prevented by considering the flow of lubricant oil. Nevertheless, in this type of tapered roller bearing, it is necessary to control the clearance between the bent portion of the cage and the outer surface of the inner race so that the bent portion of the cage is not brought into contact with the inner race while the inner race rotates, and therefore, only a narrow tolerance range is allowed in the manufacture of the tapered roller bearing.

Next, a differential mounted on a vehicle such as an automobile will be described below. In a differential of a vehicle, a pinion shaft is supported by two tapered roller bearings in a housing (for example, see Japanese Patent Laid-Open No. 11-48805). In the two tapered roller bearings, since contact areas among the outer race, the tapered rollers and the inner race are substantial and the tapered rollers slide on a large flange portion of the inner race, large rotational resistance is induced. In this regard, although the two tapered roller bearings are lubricated by an oil bath lubrication method in which lubricant oil accommodated in the housing is forced to be introduced into the tapered roller bearings, if an excessive amount of lubricant oil is introduced into the tapered roller bearings, as agitation resistance of the lubricant oil increases, rotation resistance also increases. Further, as abrasion debris from gears, etc. which is contained in the lubricant oil enters the tapered roller bearings, the tapered rollers and raceways of the outer and inner races are likely to be damaged.

SUMMARY OF THE INVENTION

Accordingly, the present invention has been made to solve the above-mentioned problems, and an object of the present invention is to provide a tapered roller bearing which is constructed to optimize oil flow therein to thereby reduce rotational torque and to allow an manufacturing error of the tapered roller bearing to a certain extent, and a bearing device for supporting a pinion shaft, which is constructed to limit an amount of lubricant oil passing through a tapered roller bearing positioned adjacent to a pinion gear, without using a separate component part, to thereby reduce agitation resistance of the lubricant oil in the tapered roller bearing.

In order to achieve the above object, the present invention is characterized by the constructions as described below.

(1) A tapered roller bearing comprises an outer race; an inner race; a plurality of tapered rollers interposed between the outer race and the inner race; and a cage for retaining the tapered rollers; wherein the inner race includes a tapered raceway in which the tapered rollers are disposed and a small-diameter end portion and a large-diameter end portion which are formed at both ends of the raceway, wherein the small-diameter end portion of the inner race is formed with a small flange portion for limiting axial movement of the tapered rollers and a cylindrical portion which has a less diameter than the small flange portion, wherein the cage has a small-diameter end portion which is positioned at the small-diameter end portion of the inner race and a large-diameter end portion which is positioned at the large-diameter end portion of the inner race, and wherein the small-diameter end portion of the cage has a bent portion which is faced to an outer surface of the cylindrical portion of the inner race with a predetermined clearance therefrom such that a labyrinth is created between the cage and the inner race.

(2) In the tapered roller bearing according to (1), an inner diameter of the bent portion of the cage is less than an outer diameter of the small flange portion of the inner race.

(3) A bearing device for supporting a pinion shaft comprises a housing; a pinion shaft having a pinion gear formed at one end thereof; an inclined contact type rolling bearing for supporting the pinion shaft with respect to the housing; and a tapered roller bearing which is positioned closer to the pinion gear than the inclined contact type rolling bearing, for supporting the pinion shaft with respect to the housing, the inclined contact type rolling bearing and the tapered roller bearing being back-to-back assembled on the pinion shaft and lubricated by oil bath lubrication; the tapered roller bearing comprising an outer race, an inner race, a plurality of tapered rollers interposed between the outer race and the inner race, and a cage for retaining the tapered rollers, wherein the inner race includes a tapered raceway in which the tapered rollers are disposed and a small-diameter end portion and a large-diameter end portion which are formed at both ends of the raceway, wherein the small-diameter end portion of the inner race is formed with a small flange portion for limiting axial movement of the tapered rollers, wherein the cage has a greater diameter than a virtual tapered surface which is formed by connecting rotational axes of the tapered rollers, wherein the cage is formed at a small-diameter end portion thereof with a bent portion which is bent inward in a radial direction, and wherein an inner diameter of the bent portion is less than an outer diameter of the small flange portion of the inner race, and the bent portion is positioned opposite to a front surface of the inner race in a non-contacted manner.

(4) In the bearing device for supporting a pinion shaft according to (3), oil accommodated in the housing passes through the rear surfaces of the outer races into the tapered roller bearing and the inclined-contact type rolling bearing.

The configurations of the large-diameter end portions of the inner race and the cage and the configuration of the outer race are not specifically limited, and various conventional configurations may be appropriately adopted.

A positional relationship between the bent portion of the cage and the inner race is appropriately established in a manner such that a labyrinth is defined in an oil inlet section to reduce an oil inflow through the oil inlet section, and more concretely, an axial distance between the small flange portion of the inner race and the bent portion of the cage is 1.5 to 3 mm and a radial distance between the radial inner surface of the bent portion of the cage and the outer surface of the cylindrical portion of the inner race is 1 to 2 mm. These distances serve as reference dimensions in the manufacture of the tapered roller bearing, while allowing a tolerance range to be widened in the manufacture of the tapered roller bearing.

In the tapered roller bearing according to the present invention, since the labyrinth is defined between the cage and the inner race which define the oil inlet section, an oil inflow into the tapered roller bearing is reduced, whereby agitation resistance of the oil and torque loss of the tapered roller bearing decrease. In addition, because these effects are accomplished so long as a clearance between the cage and the inner race is within a predetermined range, a manufacturing error can be allowed and the manufacture of the tapered roller bearing can be implemented in a convenient manner.

DESCRIPTION OF THE PREFERRED EMBODIMENTS

Hereafter, preferred embodiments of the present invention will be described with reference to the drawings. In the following description, the left and right mean the left and right on the planes of the drawings.

First Embodiment

Figure 1:
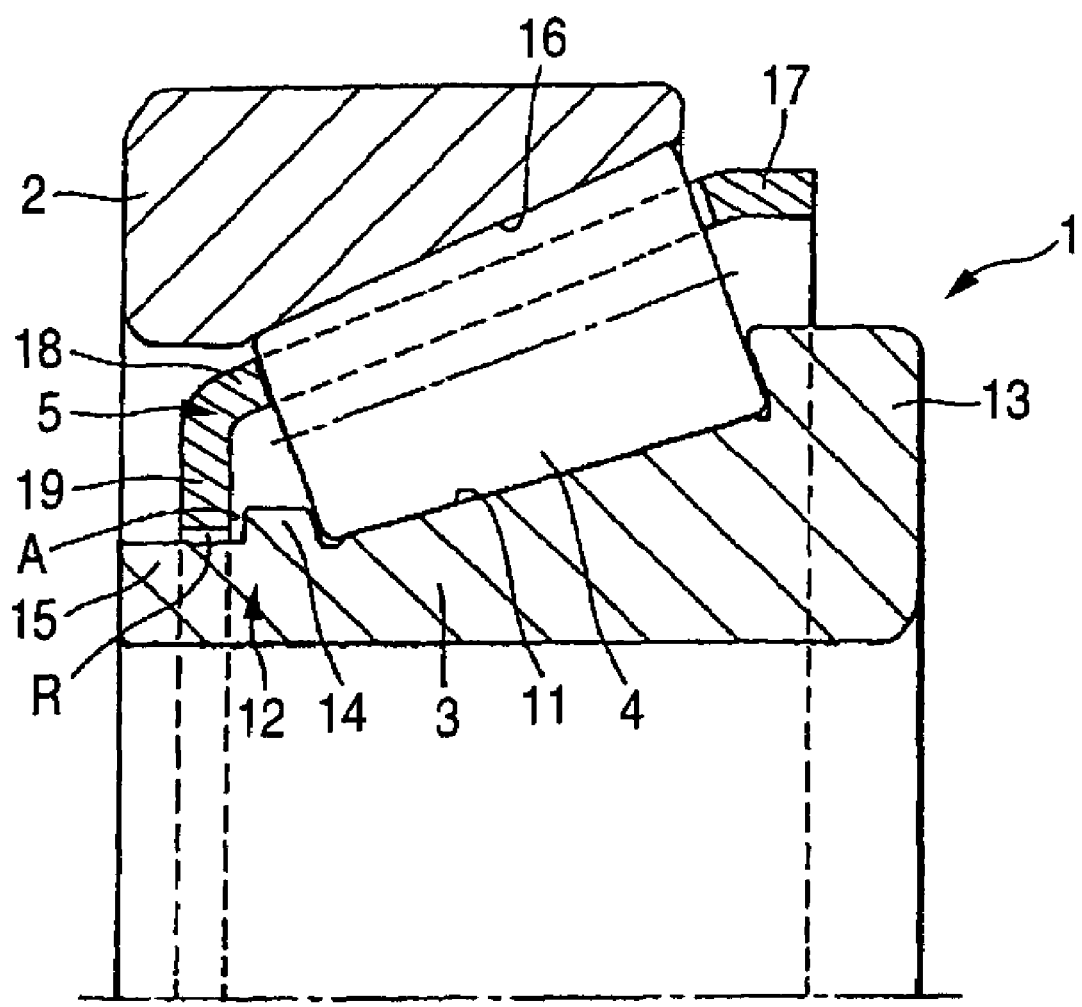
FIG. 1. is a longitudinal cross-sectional view illustrating an upper half of a tapered roller bearing in accordance with an embodiment of the present invention.

A tapered roller bearing 1 in accordance with an embodiment of the present invention which is shown in FIG. 1 includes an outer race 2, an inner race 3, a plurality of tapered rollers 4 which are interposed between the outer race 2 and the inner race 3, and a cage 5 for retaining the tapered rollers 4.

The inner race 3 has a tapered raceway 11, a small-diameter end portion 12 which is formed at the left end of the raceway 11, and a large-diameter end portion 13 which is formed at the right end of the raceway 11. The small-diameter end portion 12 of the inner race 3 has a small flange portion 14 for limiting axial movement of the tapered rollers 4 and a cylindrical portion 15 which has a less diameter than the small flange portion 14 and is connected to the axial outer end of the small flange portion 14. The large-diameter end portion 13 of the inner race 3 has a large flange portion for limiting axial movement of the tapered rollers 4.

The outer race 2 has a tapered raceway 16. The right end surface of the outer race 2 is positioned inward of the right end surface of the inner race 3, and the left end surface of the outer race 2 is flushed with the left end surface of the inner race 3.

The cage 5 has a large-diameter end portion 17 which projects out of the right ends of the tapered rollers 4 and a small-diameter end portion 18 which projects out of the left ends of the tapered rollers 4. The small-diameter end portion 18 of the cage 5 has a bent portion 19 which is bent inward in a radial direction. The bent portion 19 is faced to the outer surface of the cylindrical portion 15 of the small-diameter end portion 12 of the inner race 3 with a predetermined clearance therefrom such that a labyrinth is formed between the bent portion 19 of the cage 5 and the small-diameter end portion 12 of the inner race 3.

In FIG. 1, an axial clearance A is defined between the left (end) surface of the small flange portion 14 of the inner race 3 and the right surface of the bent portion 19 of the cage 5 at the small diameter side, and a radial clearance R is defined between the outer surface of the cylindrical portion 15 of the inner race 3 at the small diameter side and the inner surface of the bent portion 19 of the cage 5 at the small diameter side. Here, the axial clearance A is set to 1.5 to 3 mm and the radial clearance R is set to 1 to 2 mm.

Second Embodiment

The tapered roller bearing according to the present invention can be suitably employed for rotatably supporting a pinion shaft with respect to a differential carrier or for rotatably supporting a differential case with respect to a differential carrier, in a final reduction gear of an automotive vehicle having a final gear or a differential gear.

Figure 2:
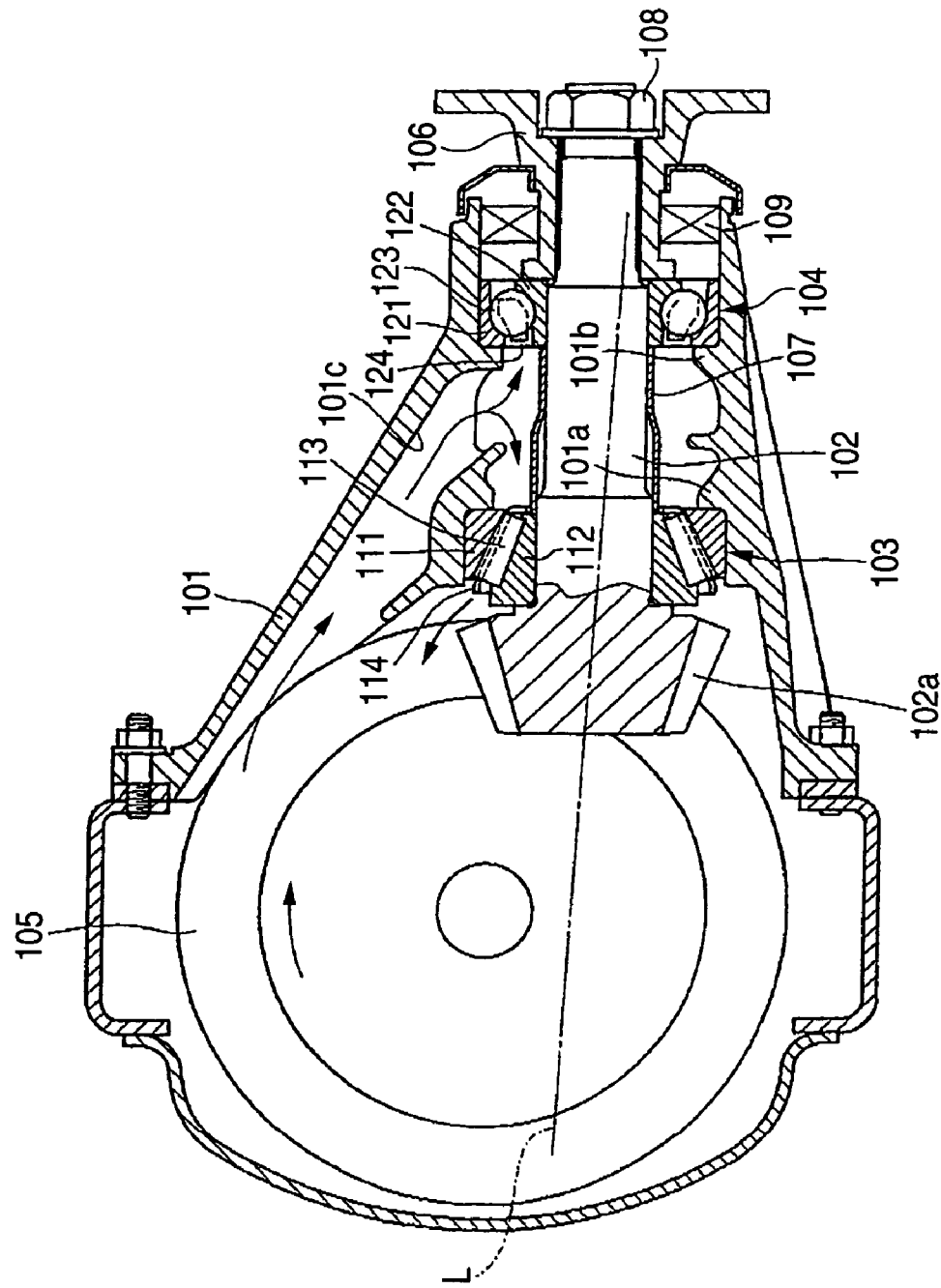
FIG. 2 is a cross-sectional view illustrating a differential which is related with a best mode of the present invention.
Figure 3:
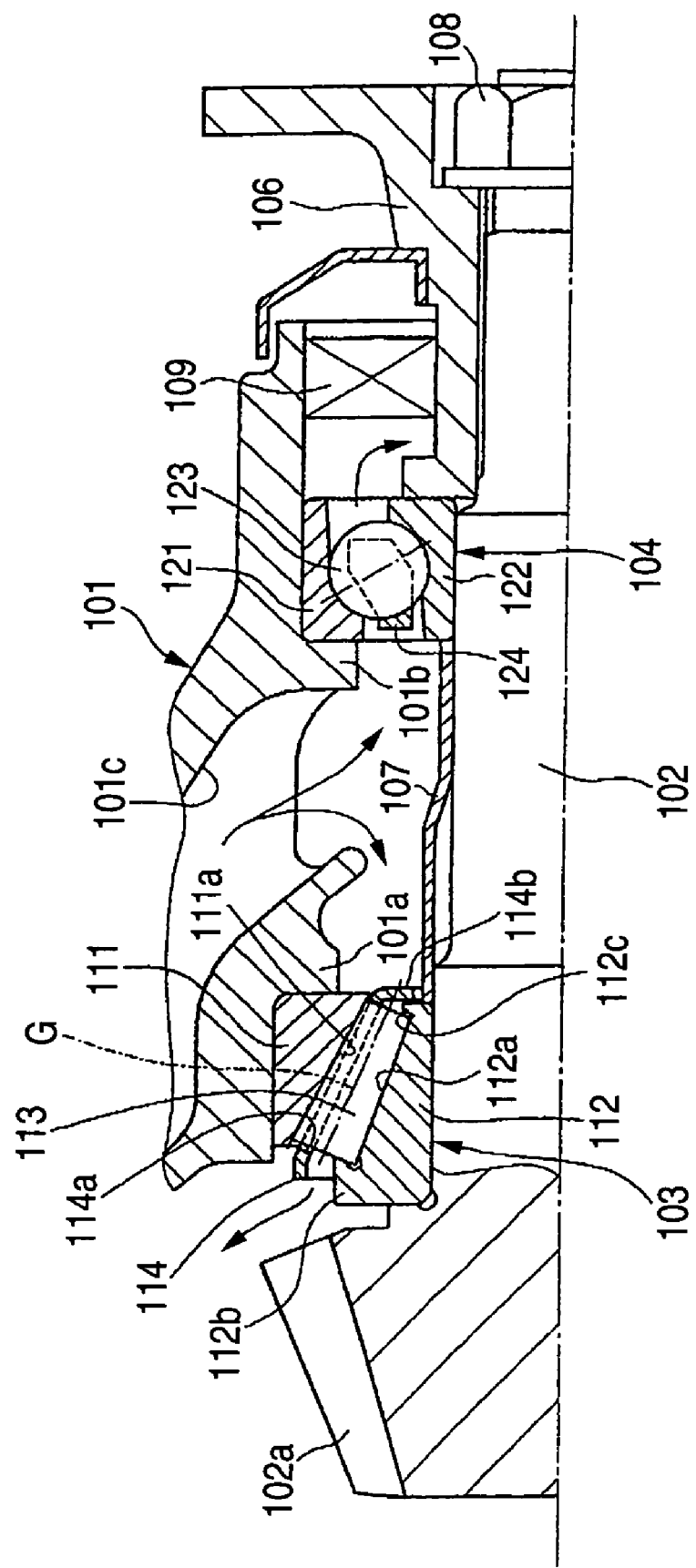
FIG. 3 is an enlarged cross-sectional view illustrating a bearing device of FIG. 2, for supporting a pinion shaft.
Figure 4:
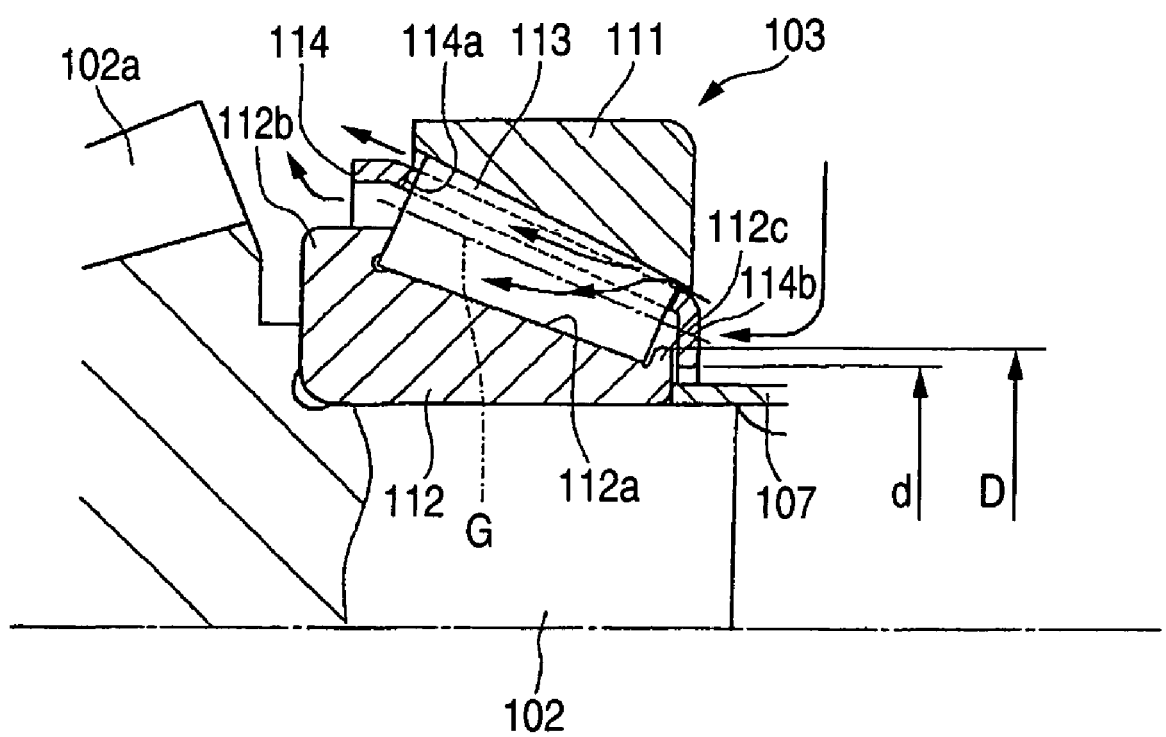
FIG. 4 is an enlarged cross-sectional view illustrating a tapered roller bearing of FIG. 3, which is adjacent to the pinion shaft.

Hereinbelow, an example in which the tapered roller bearing according to the present invention is applied to a differential gear will be described in detail with reference to FIGS. 2 through 4. FIG. 2 is a cross-sectional view illustrating a differential according to the present invention; FIG. 3 is an enlarged cross-sectional view illustrating a bearing device of FIG. 2, for supporting a pinion shaft; and FIG. 4 is an enlarged cross-sectional view illustrating a tapered roller bearing of FIG. 3, which is positioned adjacent to the pinion shaft.

A bearing device for supporting a pinion shaft of a differential in accordance with this embodiment of the present invention is constructed in such a manner that a pinion shaft 102 which is formed with a pinion gear 102a is rotatably supported by a single-row tapered roller bearing 103 and a single-row angular ball bearing 104 in a housing 101 having a two-piece structure. The pinion gear 102a of the pinion shaft 102 is meshed with a ring gear 105.

The tapered roller bearing 103 and the angular ball bearing 104 are back-to-back assembled in the housing 101, and pre-load is applied to the tapered roller bearing 103 and the angular ball bearing 104 to maintain them in place. The pre-load for maintaining the tapered roller bearing 103 and the angular ball bearing 104 in place can be adjusted by tightening or loosening a nut 108 in a state in which the rear surface of an outer race 111 of the tapered roller bearing 103 and the rear surface of a counter-bored outer race 121 of the angular ball bearing 104 are respectively brought into contact with annular stepped portions 101a and 101b of the housing 101, the rear surface of an inner race 112 of the tapered roller bearing 103 is brought into contact with one end of the pinion gear 102a, the rear surface of a counter-bored inner race 122 of the angular ball bearing 104 is brought into contact with an inner end surface of a companion flange 106, and a spacer 107 is interposed between the front surface of the inner race 112 of the tapered roller bearing 103 and the front surface of the counter-bored inner race 122 of the angular ball bearing 104.

In the tapered roller bearing 103, a plurality of tapered rollers 113 are interposed between the outer race 111 and the inner race 112 and are retained by a cage 114 to be spaced apart at regular intervals in a circumferential direction. In the angular ball bearing 104, a plurality of balls 123 are interposed between the counter-bored outer race 121 and the counter-bored inner race 122 and are retained by a cage 124 to be spaced apart at regular intervals in a circumferential direction.

The tapered roller bearing 103 and the angular roller bearing 104 are lubricated by an oil bath lubrication method in which lubricant oil accommodated in the housing 101 is forced to be introduced into the tapered roller bearing 103 and the angular roller bearing 104. Concretely speaking, lubricant oil is accommodated in the housing 101 to the level L indicated by the one-dot chain line in FIG. 2, and substantially lower halves of the tapered roller bearing 103 and the angular ball bearing 104 are submerged into the lubricant oil. The lubricant oil accommodated in the housing 101 is spattered upward as shown by the arrows in FIG. 2 by virtue of the rotation of the ring gear 105 and then passes through an oil path 101c defined in the housing 101. Thereafter, the lubricant oil reaches a space defined between the tapered roller bearing 103 and the angular ball bearing 104, and is introduced into the tapered roller bearing 103 and the angular ball bearing 104. As the lubricant oil flows in this way, the lubricant oil passes through the interiors of the bearings 103 and 104.

At this time, because the tapered roller bearing 103 which is positioned adjacent to the pinion gear 102a is lubricated not only by the lubricant oil which is supplied through the oil path 101c of the housing 101 but also by the lubricant oil which is directly spattered by the rotation of the ring gear 105, the lubricant oil is excessively introduced into the tapered roller bearing 103. In this regard, since the tapered roller bearing 103 which is opposite to the pinion gear 102a is installed to have a differential slope (a nose angle), in the case of a cold start, if flowability of lubricant oil is low, lubricant oil cannot be properly supplied, and the resistance of the tapered roller bearing 103 against seizure may be deteriorated. Meanwhile, since the lubricant oil which is directly spattered by the rotation of the ring gear cannot reach the tapered roller bearing which is opposite to the pinion gear, the lubricant oil is insufficiently introduced into the angular ball bearing. Further, by the fact that an opening of the housing 101 into which the companion flange 106 is inserted is closed by a closing device 109, a substantial amount of lubricant oil is introduced from the side of the angular ball bearing 104 which is opposite to the pinion gear 102a (and adjacent to the companion flange 106) into the tapered roller bearing 103 which is opposite to the pinion gear 102a. Basically, because the tapered roller bearing 103 and the angular ball bearing 104 have differently configured power-transmitting elements, although the same amount of lubricant oil is introduced into both bearings 103 and 104, the tapered roller bearing 103 has greater agitation resistance of the lubricant oil.

From these viewpoints, according to the present invention, an amount of lubricant oil passing through the tapered roller bearing 103 which is opposite to the pinion gear 102a is limited as described below, without using a separate component part. Meanwhile, an amount of lubricant oil passing through the angular ball bearing 104 which is opposite to the pinion gear 102a is not specifically limited.

Speaking in detail, a raceway 112a is defined on the axial middle portion of the outer surface of the inner race 112. A large flange portion 112b is formed at a large-diameter end of the raceway 112a, and a small flange portion 112c is formed at a small-diameter end of the raceway 112a. The cage 114 has a tapered configuration, and pockets 114a are defined through the cage 114 in a radial direction at a plurality of locations along a circumferential direction. A bent portion 114b is formed at the small-diameter end portion of the cage 114 to extend in a radial direction. An inner diameter d of the bent portion 114b of the cage 114 is less than an outer diameter D of the small flange portion 112c of the inner race 112. The bent portion 114b of the cage 114 is positioned opposite to the front surface of the inner race 112 in a non-contacted manner.

The cage 114 has a greater diameter than a virtual tapered surface which is formed by connecting rotational axes G of the tapered rollers 113. By this fact, in a substantially annular space defined between the outer race 111 and the inner race 112, the area of an opening at the front side of the inner race 112 closed by the bent portion 114b of the cage 114 can be increased. Further, when assembling the tapered roller bearing 103, by placing the cage 114 on the raceway 112a of the inner race 112 and then snugly fitting the tapered rollers 113 into the pockets 114a of the cage 114, the inner race 112, the tapered rollers 113 and the cage 114 can be integrated with one another, whereby the tapered roller bearing 103 can be easily assembled and handled.

As a consequence, the lubricant oil flowing toward the tapered roller bearing 103 cannot be substantially introduced into the tapered roller bearing 103 through between the small flange portion 112c of the inner race 112 and the bent portion 114b of the cage 114, and only can be introduced into the tapered roller bearing 103 through a clearance defined between the outer circumferential surface of the cage 114 and the raceway 111a of the outer race 111, whereby an amount of lubricant oil introduced into the tapered roller bearing 103 can be limited. The amount of lubricant oil introduced into the tapered roller bearing 103 can be adjusted by controlling the clearance as occasion demands.

The lubricant oil introduced into the tapered roller bearing 103 flows in a state in which it is distributed over the entire annular space defined between the outer race 111 and the inner race 112, as shown by the arrows in FIG. 4. Therefore, contact regions among the outer race 111, the tapered rollers 113 and the inner race 112 can be reliably lubricated. As can be readily seen from FIG. 4, while rolling on the raceway 111a of the outer race 111 and the raceway 112a of the of the inner race 112, the tapered rollers 113 are brought into contact with the large flange portion 112b of the inner race 112 and not brought into contact with the small flange portion 112c of the inner race 112. The small flange portion 112c of the inner race 112 is formed to allow the tapered roller bearing 103 to be easily assembled and handled.

As described above, by modifying a configuration of the cage 114 which is a component part of the tapered roller bearing 103 which is positioned adjacent to the pinion gear 102a, it is possible to limit an amount of lubricant oil introduced into the tapered roller bearing 103 without using a separate component part. Accordingly, since agitation resistance of the lubricant oil in the tapered roller bearing 103 can be reduced, the pinion shaft 102 can be stably supported with low rotation resistance. Further, because abrasion debris contained in the lubricant oil cannot be easily introduced into the tapered roller bearing 103, abrasion resistant characteristic of the tapered roller bearing 103 can be improved. Further, owing to the fact that an amount of lubricant oil introduced into the tapered roller bearing 103 is limited by using the component part of the tapered roller bearing 103 itself, the need of using a separate component part is obviated, and a manufacturing cost of the tapered roller bearing 103 can be reduced. Thus, it is possible to provide, at a reduced cost, a bearing device for supporting a pinion shaft, which can stably support the pinion shaft 102 with low rotation resistance.

Other Embodiments

Hereafter, other embodiments of the present invention will be described.

In FIG. 3, a type of the angular ball bearing 104 which is opposite to the pinion gear 102a (and adjacent to the companion flange 106) is not limited to specific ones so long as an inclined contact rolling bearing is employed. For example, the bearing which is opposite to the pinion gear 102a may comprise the so-called tandem type double-row inclined contact ball bearing 130 as shown in FIG. 5 or a single-row tapered roller bearing 140 as shown in FIG. 6.

Figure 5:
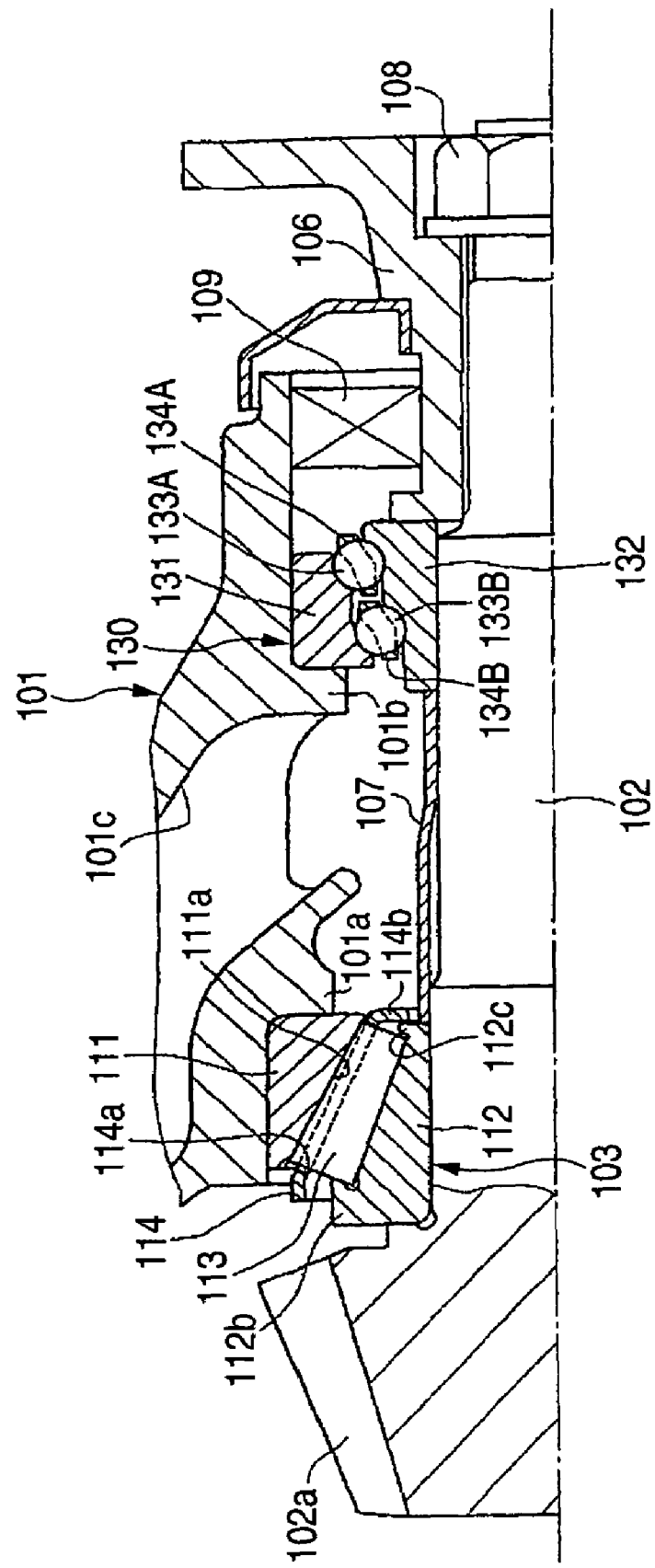
FIG. 5 is a cross-sectional view illustrating another bearing device for supporting a pinion shaft in accordance with another embodiment of the present invention.

The double-row inclined contact ball bearing 130 shown in FIG. 5 comprises an outer race 131, an inner race 132, two rows of balls 133A and 133B, and two cages 134A and 134B. The two rows of balls 133A and 133B have the same diameter. A pitch diameter of one row of balls 133A is greater than that of the other row of balls 133B, and the two rows of balls 133A and 133B have the same contact angle. Therefore, two action lines extend in the same direction. The double-row inclined contact ball bearing 130 which is constructed in this way is called the tandem type double-row inclined contact ball bearing. In this regard, the tandem type double-row inclined contact ball bearing may have two rows of balls 133A and 133B which have different diameters and contact angles.

Figure 6:
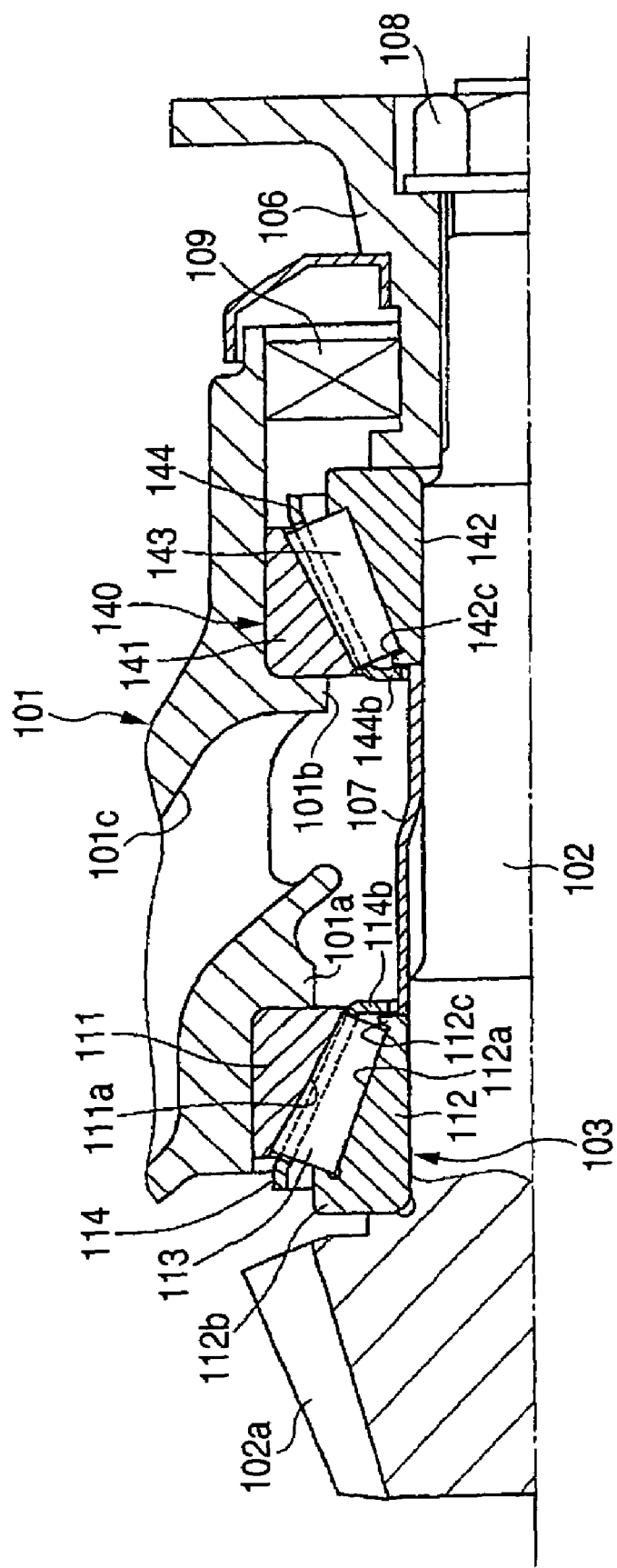
FIG. 6 is a cross-sectional view illustrating still another bearing device for supporting a pinion shaft in accordance with still another embodiment of the present invention.
Figure 7:
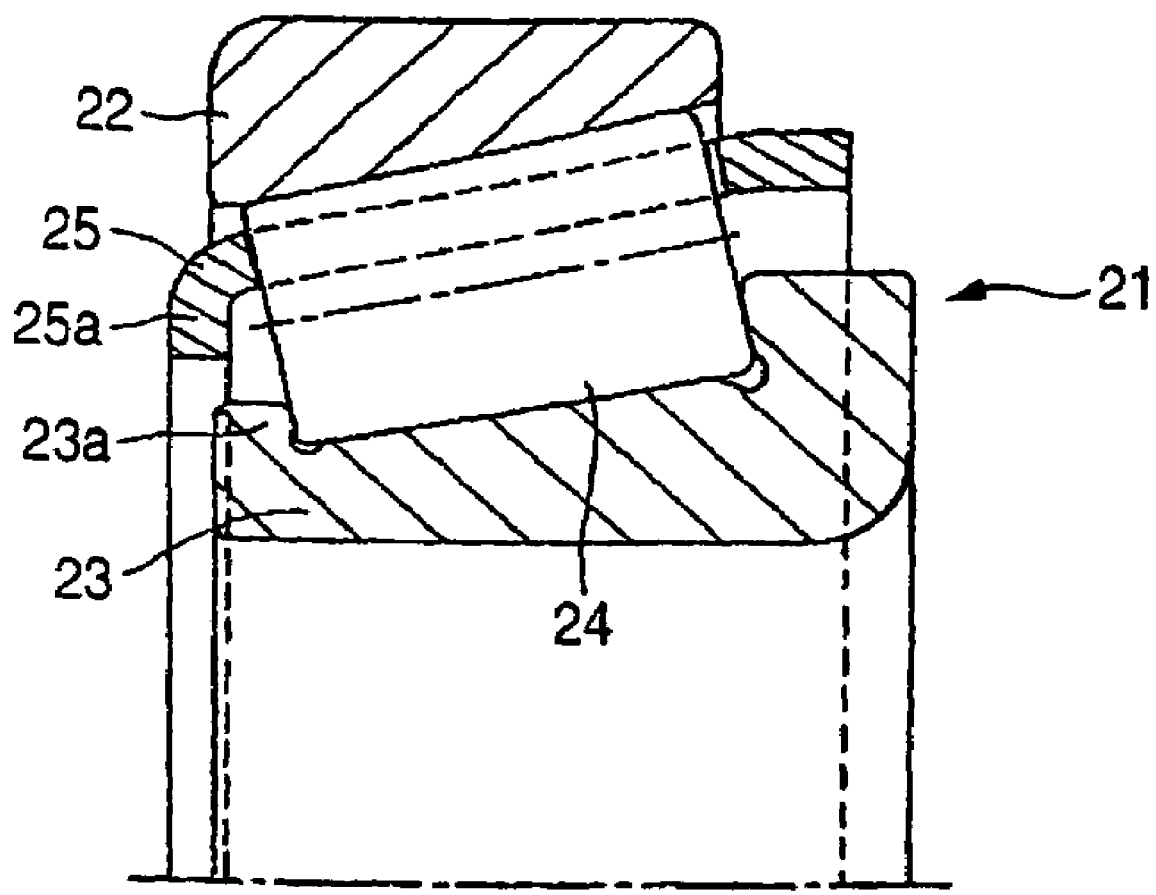
FIG. 7 shows a conventional tapered roller bearing.

The tapered roller bearing 140 shown in FIG. 6 comprises an outer race 141, an inner race 142, tapered rollers 143 and a cage 144. Therefore, the tapered roller bearing 140 is constructed in the same manner as the tapered roller bearing 103 shown in FIG. 4 which is positioned adjacent to the pinion gear 102a. In this connection, in the tapered roller bearing 140 shown in FIG. 6 which is opposite to the pinion gear 102a, an inner diameter d of a bent portion 144b of the cage 144 may be the same as or slighter greater than an outer diameter D of a small flange portion 142c of the inner race 142, so as not to limit an amount of lubricant oil introduced into the tapered roller bearing 140.

The bearing device for supporting a pinion shaft may be applied to a transfer of a four-wheel drive vehicle, and so forth.

What is claimed is:

1. A tapered roller bearing comprising:
   an outer race;
   an inner race;
   a plurality of tapered rollers interposed between the outer race and the inner race; and
   a cage that retains the tapered rollers;
   wherein the inner race includes a tapered raceway in which the tapered rollers are disposed and a small-diameter end portion and a large-diameter end portion which are formed at opposite ends of the raceway,
   wherein the small-diameter end portion of the inner race is formed with a small flange portion for limiting axial movement of the tapered rollers and a cylindrical portion which has a smaller diameter than that of the small flange portion,
   wherein the cage includes a small-diameter end portion which is positioned at the small-diameter end portion of the inner race and a large-diameter end portion which is positioned at the large-diameter end portion of the inner race, and
   wherein the small-diameter end portion of the cage includes a bent portion which is faced to and is out of contact with an outer surface of the cylindrical portion of the inner race with a predetermined clearance therefrom such that a labyrinth is formed between the small-diameter end portion and the inner race.

2. The tapered roller bearing according to claim 1, wherein an inner diameter of the bent portion of the cage is less than an outer diameter of the small flange portion of the inner race.

3. The tapered roller bearing according to claim 1, wherein an axial surface of the outer race that is disposed opposite to the large-diameter portion of the inner race is offset from the large-diameter portion of the inner race.

4. The tapered roller bearing according to claim 1, wherein an axial surface of the outer race that is disposed opposite to the small-diameter portion of the inner race is aligned with the small-diameter portion of the inner race.

5. The tapered roller bearing according to claim 1, wherein an axial clearance is formed between said flange portion of the inner race and a surface of the bent portion of the cage.

6. The tapered roller bearing according to claim 1, wherein a radial clearance is formed between a surface of the cylindrical portion of the inner race and a surface of the bent portion of the cage.

7. A bearing device for supporting a pinion shaft, comprising:
   a housing;
   a pinion shaft having a pinion gear formed at one end thereof;
   an inclined contact type rolling bearing for supporting the pinion shaft with respect to the housing; and
   a tapered roller bearing which is positioned closer to the pinion gear than the inclined contact type rolling bearing and supports the pinion shaft with respect to the housing, wherein the inclined contact type rolling bearing and the tapered roller bearing are back-to-back assembled on the pinion shaft and lubricated by oil bath lubrication,
   wherein the tapered roller bearing includes:
   an outer race;
   an inner race;

a plurality of tapered rollers interposed between the outer race and the inner race; and a cage that retains the tapered rollers;

wherein the inner race includes a small-diameter end portion and a large-diameter end portion which are formed at opposite ends of the raceway, wherein the small-diameter end portion of the inner race is formed with a flange portion for limiting axial movement of the tapered rollers and a cylindrical portion which has a smaller diameter than that of the flange portion, wherein the cage includes a first end portion which is positioned at the small-diameter end portion of the inner race and a second end portion which is positioned at the large-diameter end portion of the inner race, and wherein the first end portion of the cage includes a bent portion which is faced to an outer surface of the cylindrical portion of the inner race with a predetermined clearance therefrom such that a passage is formed between the first end portion of the cage and the inner race.

8. The bearing device according to claim 7, wherein the inclined contact type rolling bearing includes a tapered roller bearing.

9. The bearing device according to claim 7, wherein oil accommodated in the housing passes through rear surfaces of the outer races into the tapered roller bearing.

10. The bearing device for supporting a pinion shaft according to claim 9, wherein oil accommodated in the housing passes through the rear surfaces of the outer races into the tapered roller bearing and the inclined-contact type rolling bearing.

11. The bearing device for supporting a pinion shaft according to claim 7, wherein the bent portion of the first end portion of the cage is out of contact with the outer surface of the cylindrical portion of the inner race.

12. A bearing device for supporting a pinion shaft, comprising:

a housing;

a pinion shaft having a pinion gear formed at one end thereof;

an inclined contact type rolling bearing for supporting the pinion shaft with respect to the housing; and a tapered roller bearing which is positioned closer to the pinion gear than the inclined contact type rolling bearing and supports the pinion shaft with respect to the housing, wherein the inclined contact type rolling bearing and the tapered roller bearing are back-to-back assembled on the pinion shaft and lubricated by oil bath lubrication;

wherein the tapered roller bearing includes:

an outer race;

an inner race;

a plurality of tapered rollers interposed between the outer race and the inner race; and a cage that retains the tapered rollers;

wherein the inner race includes a tapered raceway in which the tapered rollers are disposed and a small-diameter end portion and a large-diameter end portion which are formed at opposite ends of the raceway, wherein the small-diameter end portion of the inner race is formed with a small flange portion for limiting axial movement of the tapered rollers, wherein the cage includes a greater diameter than a virtual tapered surface which is formed by connecting rotational axes of the tapered rollers, wherein the cage is formed at a small-diameter end portion thereof with a bent portion which is bent inward in a radial direction, and wherein an inner diameter of the bent portion is less than an outer diameter of the small flange portion of the inner race, and the bent portion is positioned opposite to a front surface of the inner race in a non-contacted manner.

13. The bearing device according to claim 12, wherein oil accommodated in the housing passes through rear surfaces of the outer races into the tapered roller bearing and the inclined-contact type rolling bearing.

14. The bearing device according to claim 12, wherein the inclined contact type rolling bearing includes a tapered roller bearing.

15. The bearing device for supporting a pinion shaft according to claim 14, wherein oil accommodated in the housing passes through the rear surfaces of the outer races into the tapered roller bearing and the inclined-contact type rolling bearing.

* * * * *